F. OWEN.
SHOCK BINDER.
APPLICATION FILED JUNE 7, 1911.
1,009,992.
Patented Nov. 28, 1911.
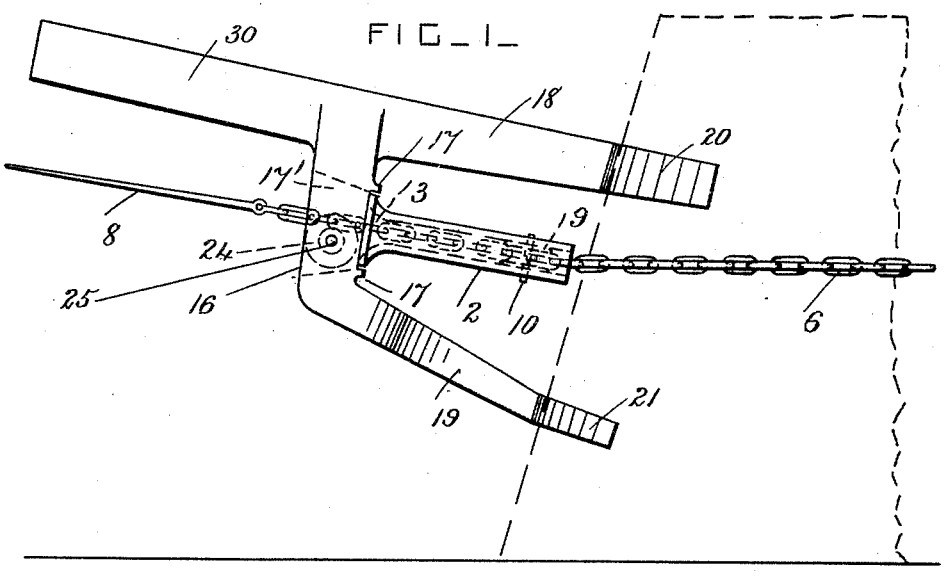
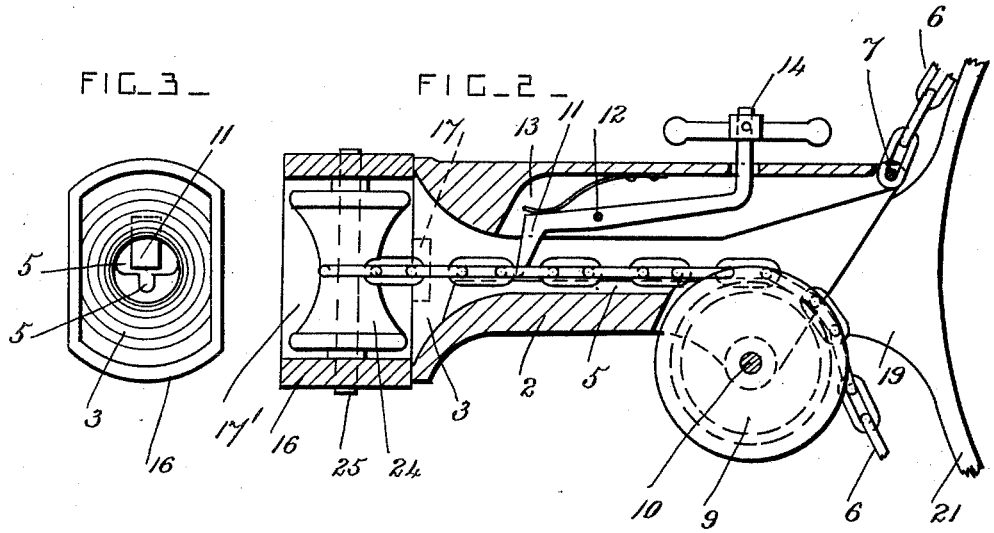
Witnesses
Geo C Poneton
Chas M Baruch
Inventor
Fletcher Owen,
By Herbert W. Jenner.
Attorney
COLUMBIA PLANOGRAPH CO., WASHINGTON, D. C.

UNITED STATES PATENT OFFICE.

FLETCHER OWEN, OF WORTHINGTON, INDIANA.

SHOCK-BINDER.

1,009,992.

Specification of Letters Patent.

Patented Nov. 28, 1911.

Application filed June 7, 1911. Serial No. 631,836.

*To all whom it may concern:*

Be it known that I, FLETCHER OWEN, a citizen of the United States, residing at Worthington, in the county of Greene and State of Indiana, have invented certain new and useful Improvements in Shock-Binders; and I do hereby declare the following to be a full, clear, and exact description of the invention, such as will enable others skilled in the art to which it appertains to make and use the same.

This invention relates to binders for tightly encircling shocks of corn as they stand in the field so that they can be loaded onto wagons; and it consists in the novel construction and combination of the parts hereinafter fully described and claimed.

In the drawings, Figure 1 is a side view of a shock binder constructed according to this invention. Fig. 2 is a sectional plan view of the housing of the binder, drawn to a larger scale, and showing the abutment-piece in cross-section. Fig. 3 is an end view of the housing.

The housing 2 of the shock binder is of tubular form, and it is provided with a flaring or bell-mouthed end portion 3. This housing has channels 5 in it which fit against the binding chain 6, which is provided for binding the shock. The chain 6 is secured at one end to the housing by a pin or other suitable fastening device 7, and it is provided with a short rod or needle 8 at its other end.

The chain 6 is passed around the shock of corn as it stands in the field and its needle is passed through the tubular housing. A guide sheave 9 for the chain is journaled on a pin 10 in the housing, and at the opposite side thereof from the fastening 7. A spring-pressed catch or pawl 11 is pivoted on a pin 12 in a slot or chamber 13 at the other side of the housing from the guide grooves, and is provided with a projecting end portion 14 for disengaging the pawl from the links of the chain. The spring normally presses the pawl into engagement with the links of the chain as they rest in the channels 5, and prevents the chain from becoming slack around the shock.

An abutment-piece 16 is provided for the housing to bear against, and 17 are lugs on the abutment-piece which engage with the housing and prevent it from slipping. The abutment-piece has a slot or opening 17' through which the end portion of the chain is passed. Arms 18 and 19 project from and form the end portions of the abutment-piece, and the housing is arranged in the space between these arms and between the middle part of the abutment-piece and the shock. The arms 18 and 19 have curved abutment-plates 20 and 21 on their respective ends, and these curved plates are arranged in a plane beyond the other end of the housing and bear against the side of the shock, which is partially indicated by the dotted lines in Fig. 1.

The abutment-piece is pressed against the side of the shock by an arm 30 when the parts are in the positions shown in Fig. 1, and the free end of the chain can then be pulled upon so as to tighten the loop of the chain upon the shock. The chain consolidates the loose stalks and leaves of the shock, which it encircles, and forms them into a compact mass, and the shock can subsequently be picked up by its binder chain and loaded onto a wagon without dropping to pieces and without any of the stalks being separated from it.

A guide sheave 24 is also journaled on a pin 25 in the slot or opening 17' of the abutment-piece. The end portion of the chain is strained over this sheave, and it and the bell-mouthed opening of the housing enable the chain to be tightened around the shock to the requisite extent even when the pull is not exactly in line with the axis of the tubular housing.

The abutment-piece enables the chain to be drawn much tighter around the shock than would otherwise be possible, and it is removed after the shock is bound. When the shock has been loaded and carried away, its is subsequently unbound by depressing the pawl to release the chain from it, and the corn stalks can then be fed to any approved form of shredding machine.

What I claim is:

1. In a shock binder, the combination, with a tubular housing having a longitudinal guide groove, of a guide sheave journaled at the rear end of the housing with its groove in line with the guide groove, a binder chain secured to the rear end of the housing and engaging with the said guide sheave and guide groove, and a spring-pressed pawl pivoted inside the housing opposite the guide groove and adapted to engage with the said chain, said pawl being provided with an extension for retracting it which projects from the said housing.

2. In a shock binder, the combination, with a tubular housing, of a binder chain secured to the housing at one end and adapted to slide in the said housing, a catch for retaining the chain in the housing, and an abutment-piece for one end of the housing to bear against, said abutment-piece having an opening at its middle part for the passage of the binder chain and having arms at its ends which project beyond the other end of the housing and are provided with abutment plates adapted to bear against the side of the shock.

3. In a shock binder, the combination, with a tubular housing, of a binder chain secured to the housing at one end and adapted to slide in the said housing, a catch for retaining the chain in the housing, an abutment-piece for one end of the housing to bear against, said abutment-piece having an opening at its middle part for the passage of the binder chain and having arms at its ends which project beyond the other end of the housing and are provided with abutment plates adapted to bear against the side of the shock, and means for guiding the chain in the opening of the abutment-piece, said housing and abutment-piece being also provided with interlocking portions on their adjacent surfaces to prevent one from slipping on the other.

In testimony whereof I have affixed my signature in the presence of two witnesses.

FLETCHER OWEN.

Witnesses:
WILLIAM B. HARRAH,
W. Z. BARKER.

---

Copies of this patent may be obtained for five cents each, by addressing the " Commissioner of Patents, Washington, D. C."